United States Patent [19]

Abramson et al.

[11] 4,178,219
[45] Dec. 11, 1979

[54] METHOD FOR PRODUCING MINERAL BINDER

[76] Inventors: Iosif G. Abramson, Varshavskaya ulitsa, 22, kv. 16; Boris V. Volkonsky, ploschad Chernyshevskogo, 7, kv. 7; Vasily A. Glukhikh, Belgradskaya ulitsa, 10, korpus 1, kv. 5; Solomon I. Danjushevsky, ploschad Chernyshevskogo, 7, kv. 79; Georgy B. Egorov, Grazhdansky prospekt, 90, korpus 2, kv. 103; Raisa A. Zozulya, 9 linia, 76, kv. 7; Alexei I. Natnenkov, Metallostroi, ulitsa Polevaya, 22, kv. 31; Jury V. Nikiforov, Zanevsky prospekt, 30, kv. 23; Rafail M. Nudelman, Nevsky prospekt, 61, kv. 1; Alexandr M. Khomyakov, Ivanovskaya ulitsa, 18, kv. 15; Boris M. Bresler, Lermontovsky prospekt, 8/10a, kv. 30; Igor A. Prudnikov, ulitsa Dimitrova, 4, korpus 1, kv. 221; Janetta M. Tseitlin, prospekt Veteranov, 40, kv. 10; Zalman L. Axelrod, Svetlanovsky prospekt, 117, kv. 168; Anatoly M. Zharnitsky, ploschad Chernyshevskogo, 7, kv. 46; Jury A. Makeev, Kuznetsovskaya ulitsa, 10, kv. 248; Ivan F. Malyshev, Kustarny pereulok, 8, kv. 4; Mikhail P. Svinin, Metallostroi Polevaya ulitsa, 25, kv. 25, all of Leningrad, U.S.S.R.; Evgeny G. Komar, deceased, late of Leningrad, U.S.S.R., by Khaya S. Boguslavskaya, administrator, Kuznetsovskaya ulitsa, 36, kv. 26, Leningrad, U.S.S.R., by Olga E. Komar, administrator, Grazhdanskaya ulitsa, 16, kv. 11, Pushkin, U.S.S.R., by Alexandr E. Komar, administrator, Kuznetsovskaya ulitsa, 36, kv. 26, Leningrad, U.S.S.R.

[21] Appl. No.: 681,894

[22] Filed: Apr. 30, 1976

Related U.S. Application Data

[63] Continuation of Ser. No. 561,075, Mar. 24, 1975, abandoned.

[51] Int. Cl.² .............................................. B01J 1/10
[52] U.S. Cl. .............................................. 204/157.1 H
[58] Field of Search ................. 204/157.1 H; 264/24, 264/15; 106/102

[56] References Cited

U.S. PATENT DOCUMENTS

| 2,577,209 | 12/1951 | Rios | 204/157.1 R |
| 2,858,442 | 10/1958 | Dewey | 204/158 H |
| 2,910,372 | 10/1959 | Ruskin | 204/157.1 H |

FOREIGN PATENT DOCUMENTS

701581  3/1931  France ............................ 204/157.1 H

*Primary Examiner*—Howard S. Williams
*Attorney, Agent, or Firm*—Holman & Stern

[57] ABSTRACT

The method consists in that an initial stock mixture is exposed to an ionizing radiation with the power of absorbed radiation dose of at least 1 Mrad/s. The installation for producing a mineral binder is essentially a working chamber provided with a charging device and a discharging device, accommodating a substantially horizontal conveyer adapted to convey the material under process inside the working chamber and an ionizing radiation source. An improvement resides in that the installation is provided with a means for controlling the thickness of the layer of the material handled by the conveyor, the means being located over the conveyer ahead of the ionizing radiation source and having pipings built-in into the working chamber past the ionizing radiation source and communicating with draw-off devices. An essential advantage of both the method and installation is a great reduction, (down to a few minutes or even seconds) of the duration of the binder production process.

2 Claims, 2 Drawing Figures

METHOD FOR PRODUCING MINERAL BINDER

This is a continuation of application Ser. No. 561,075 filed Mar. 24, 1975 now abandoned.

BACKGROUND OF THE INVENTION

The present invention relates to the production of construction materials and, more particularly to methods of and installations for producing mineral binders.

Widely known is a thermal method of producing mineral binders, in particular, Portland cement, wherein a particular mineral binder is produced by calcining or sintering an appropriate raw stock mixture in roaster furnaces followed by grinding the resulting sintered cake. The method, however, suffers from the following cardinal disadvantages: along sintering time as a rule, of at least several hours and the burning of much fuel to attain a sufficiently high temperature in the furnace, the maximum furnace temperature usually amounting to 1400° to 1500° C.

Another known method of producing mineral binders, Portland cement in particular, consists of exposing an appropriate raw stock mixture to an oinizing radiation, particularly, to an electron flux. As can be seen from published data, the method is carried out under high vacuum at absorbed radiation doses not in excess of a few hundredths of megarads per second (See, for example the method of producing Portland cement according to GDR Pat. No. 68451).

The latter method is advantageous over the thermal method in that it does not require any external heat supply and, therefore, saves fuel. At the same time, however, the radiation method suffers from the disadvantage that the binder formation process requires much time.

Also, the necessity of establishing a vacuum in the working chamber hampers industrial applications of the radiation method due to the commonly known fact that providing hermetically sealed working chambers is a complicated job under industrial conditions.

The known installations for producing mineral binders according to the aforesaid method are made as a hermetically sealed chamber having a charging device at its top and a discharging device at its bottom. Provided inside the chamber is an inclined chute for the starting stock to run therealong by gravity. Located above the chute is a source of ionizing radiation, most frequently an electron-flux source, emitting electrons substantially at right angles to the material to be irradiated (See, for example, the installation for producing Portland cement, clinker disclosed in GDR Patent No. 68451).

The main disadvantage of such installations lies, in our opinion, in that a vacuum must be established in the working chamber thereof, and also in the difficulties encountered when varying the rate of travel of the material under process along the chute within a sufficiently wide range depending on the power of absorbed radiation dose.

Also known in the art are installations for treating materials by exposure to an ionizing radiation, made as a hermetically sealed chamber accommodating a horizontal conveyer adapted to treasfer the material under process within the working chamber, and a source of a flux of accelerated electrons so arranged above the conveyer that the flux of electrons is directed at right angles to the conveyer carrying surface (See, for example, the installation disclosed in U.S. Pat. No. 2,887,584).

The main disadvantage of these installations resides in that they lack means for controlling the thickness of the material layer on the conveyer.

SUMMARY OF THE INVENTION

The main object of the present invention is to improve the method of producing mineral binders by the effect of an ionizing radiation. The improvements reside in finding the values of the power of absorbed dose that are most favorable for the method to be realized.

Further objects of the present invention are to do away with the requirement of establishing a vacuum in the working chamber, to make the method widely applicable under industrial conditions and to dispense with an external supply of considerable amounts of heat obtainable by fuel combustion.

One more object of the present invention is to provide an installation for industrial application of the herein-proposed method, to ensure control of the thickness of the layer of the stock mixture as fed by the conveyer, as well as variation of the rate of travel of the stock mixture inside the chamber.

Other objects and advantages of the invention will become apparent from the detailed description that follows.

The objects are accomplished due to the fact that in producing a mineral binder by exposing the stock mixture to an ionizing radiation, the irradiation is conducted with the power of absorbed radiation dose being at least 1 Mrad/s. To save energy by use of a reduced absorbed dose, it is expedient that the stock mixture be preheated to a temperature not over 600° C.

In such a case the amount of energy saved is much larger than energy expenses for preheating the raw stock mixture. According to the herein-proposed method, an installation for producing mineral binders is made as a working chamber provided with a charging device and a discharging device and accommodating a substantially horizontal conveyer adapted to transfer the material under process within the working chamber, as well as an ionizing radiation source. According to the invention, provision is also made for a device for controlling the thickness of the layer of the material under process fed by the conveyer, the device being located above the conveyer and ahead of the ionizing radiation source, and pipings built-in into the working chamber past the ionizing radiation source and communicating with draw-off devices.

More specifically, the device for controlling the thickness of the layer of the material under process is made as a system of rolls adjustable for height and kinematically associated with a drive to impart rotation thereto.

BRIEF DESCRIPTION OF THE DRAWINGS

Given below is a detailed description of the invention illustrated by specific exemplary embodiments of the present method and by the accompanying drawings, wherein.

DETAILED DESCRIPTION OF THE PREFERRED EMBODIMENT

Figure 1:
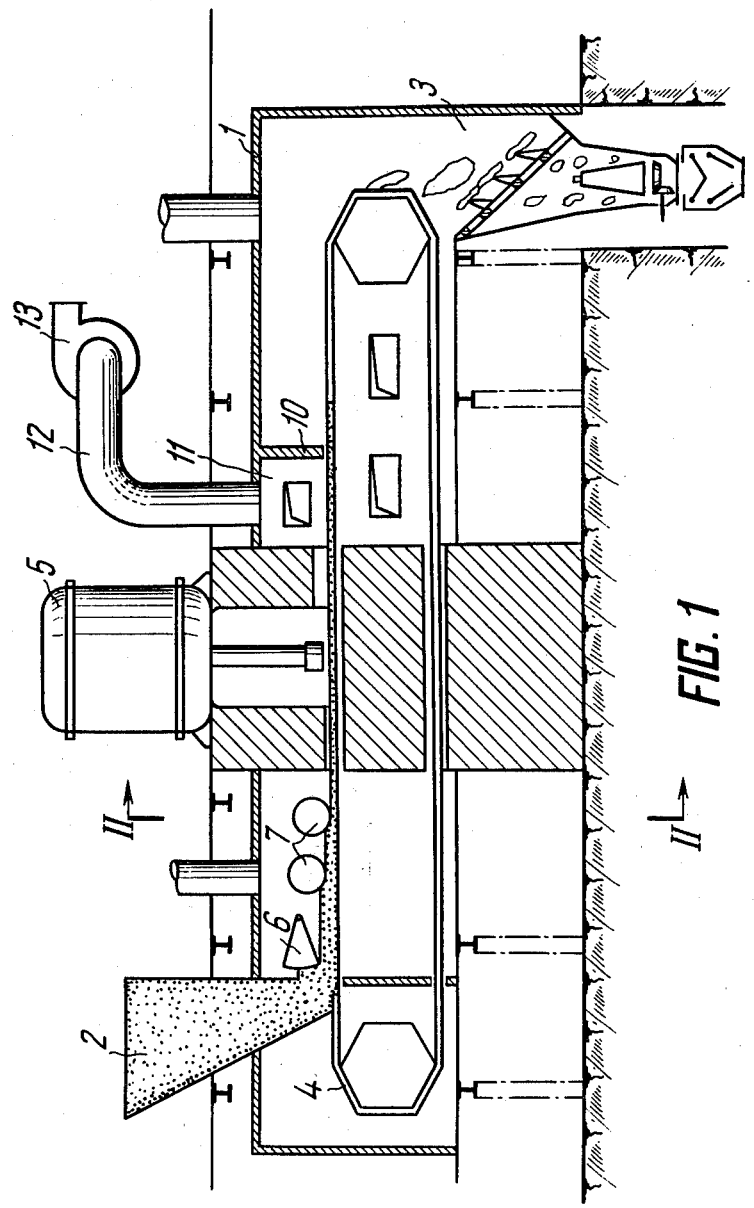
FIG. 1 is a general longitudinal-sectional view of an installation for producing mineral binders, according to the invention.
Figure 2:
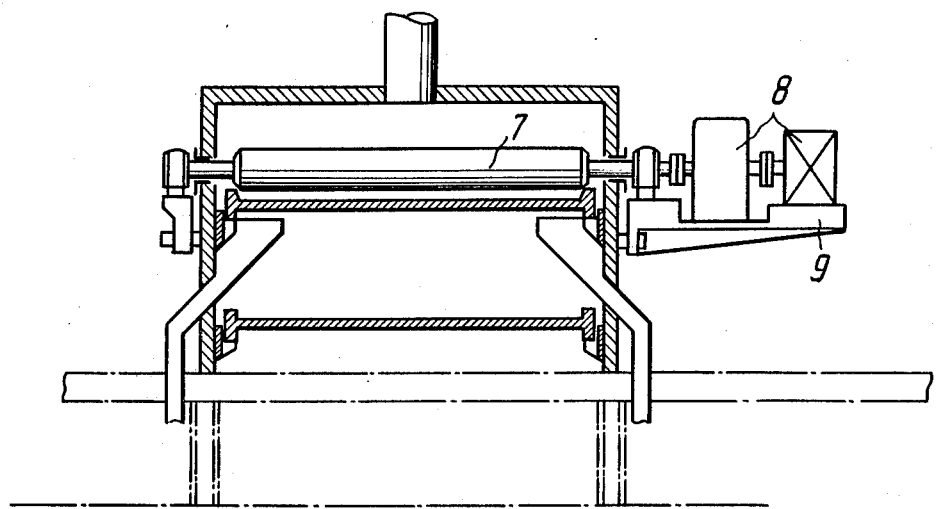
FIG. 2 is a sectional view taken along the line II—II in FIG. 1.

The installation incorporates a working chamber 1 (FIGS. 1 and 2) provided with a charging device 2 and a discharging device 3. Located inside the working chamber 1 is a horizontal conveyer 4 adapted for transferring the material in processing within the chamber from the charging device to the discharging device. The installation is also provided with an ionizing radiation source 5 which is so arranged on the installation housing that its radiation window is located inside the chamber above the middle portion of the conveyer 4 and the ionizing radiation flux is directed at right angles to the conveyer working surface.

The ionizing radiation source 5 is not described here in detail, inasmuch as such apparatus are widely known and more detailed information thereon is readily available. Some difficulties may be encountered, however, in providing industrial-application radiation sources. It should be noted in this regard that such radiation sources are now under development in the Soviet Union and will before long be disclosed in and protected by independent patent applications.

Located in the front portion of the working chamber 1 above the conveyer 4 is a device for controlling the thickness of the layer of the material carried by the conveyer 4, comprising: a gate 6 and rolls 7 associated with a drive 8 to impart positive rotation thereto. Also, the rolls 7 are mounted on a movable platform 9 (FIG. 2) enabling the rolls to be adjusted for height, whereby the thickness of the layer of the material under process, carried by the conveyer 4, is controlled. Provided past the ionizing radiation source 5 in the chamber 1 is a partition 10 which defines a compartment 11 into whose walls pipings 12 are built communicating with a draw-off means 13 and adapted to withdraw carbon dioxide gas from the compartment 11.

The present method is instrumental in producing any mineral binder, including all kinds of Portland cement and alumina cement, as well as plaster, calcareous, magnesia, dolomite and some other types of binder, though emphasis in the herein-considered method has been upon production of Portland cement. Inasmuch as all the aforelisted binders are commonly known, and the composition of their respective starting stock mixtures and methods of their preparation are well known as well, these aspects will not be discussed here, the more so as this bears no relation whatever to the realization of our method.

Any raw stock mixture suitable for producing a particular binder is continuously fed through the charging device 2 into the chamber 1. Upon getting onto the conveyer 4, the stock mixture is carried inside the working chamber 1 consecutively passing under the rolls 7 that ensure the required thickness of the layer of the material, and then under the flux of ionizing radiation.

As such a radiation equally favorable can be either gamma rays or a flux of accelerated electrons.

The conveyer speed is so selected that the material exposure time is long enough for the material to become as thoroughly irradiated as possible, whereupon the thus-treated material, which is in fact a respective mineral binder (depending upon a the particular raw stock used), is transferred by the same conveyer 4 to the discharging device 3 whence it is delivered to consumers. The raw stock mixture may be fed into the working chamber 1 after having been preheated to not over 600° C.

In the examples that follow, the method will be illustrated in the aspects of selecting the specific magnitude of the power of absorbed radiation dose, as well as regulating the thickness of the layer of the material depending upon the quality of the raw stock mixture used.

EXAMPLE 1

Production of a Portland-cement clinker.

A raw stock mixture incorporated calcium carbonate, silica gel, alumina and ferric oxide, the weight percentage composition of the mixture (as oxides) being as follows:

| | |
|---|---|
| CaO (total) | 42.27 |
| $SiO_2$ | 14.15 |
| $Al_2O_3$ | 3.73 |
| $Fe_2O_3$ | 4.07 |
| ignition losses | 34.98 |

The raw stock mixture, in an amount of 600 g with a mass layer thickness of 2 g/cm$^2$ was exposed under normal ambient conditions (i.e. at atmospheric pressure and ambient temperature of 18° to 20° C.) to the effect of a flux of electrons accelerated to an energy of 4.5 MeV, the power of absorbed radiation dose being 1 Mrad/s.

After a 30-minute treatment, a Portland-cement clinker was obtained, having the following weight percentage composition (as oxides):

| | |
|---|---|
| CaO (total) | 65.17 |
| $SiO_2$ | 22.09 |
| $Al_2O_3$ | 5.70 |
| $Fe_2O_3$ | 6.22 |
| ignition losses | 0.66 |
| CaO (free) | 1.2 |

According to petrographic and X-ray analyses, the Portland-cement clinker obtained had the following weight percentage composition:

| | |
|---|---|
| alite | 47 to 50 |
| belite | 25 to 28 |
| interstitial matrix | 17 to 20 |

Physico-mechanical testing of a cement resulting from the clinker indicated that such a cement aged 28 days had a compression strength of from 430 to 495 kgf/cm$^2$, while test results of the same cement aged 3 and 7 days complied with the requirements imposed by the British Standard for normal and fast-setting Portland cement.

EXAMPLE 2

Production a Portland-cement clinker.

A raw stock mixture comprised calcium carbonate, silica gel, alumina, ferric oxide, the weight percentage composition of the mixture (as oxides) being as follows:

| | |
|---|---|
| CaO (total) | 42.72 |
| $SiO_2$ | 13.87 |
| $Al_2O_3$ | 3.52 |
| $Fe_2O_3$ | 3.02 |

-continued

| | |
|---|---|
| ignition losses | 36.87 |

The raw stock in an amount of 850 g with a mass layer thickness of 0.6 g/cm² was exposed under normal ambient conditions to the effect of a flux of electrons accelerated to an energy of 1.5 MeV at a power of absorbed radiation dose equal to 3.8 Mrad/s. After a 100-second treatment, a Portland-cement clinker was obtained, having the following weight percentage composition (as oxides):

| | |
|---|---|
| CaO (total) | 66.83 |
| SiO$_2$ | 22.18 |
| Al$_2$O$_3$ | 5.44 |
| Fe$_2$O$_3$ | 4.43 |
| ignition losses | 0.29 |
| CaO (free) | 0.77 |

According to petrographic and X-ray analyses, the Portland-cement clinker obtained had the following weight percentage composition:

| | |
|---|---|
| alite | 60 |
| belite | 28 |
| interstitial matrix | 8 |

Physico-mechanical tests of a cement made of the clinker indicated that such a cement aged 28 days featured a compression strength of from 425 to 480 kgf/cm² and, the same cement aged 3 and 7 days complied with the requirements imposed by the British Standard for normal and fast-setting Portland cement.

EXAMPLE 3

Production of a Portland-cement clinker.

A raw stock mixture comprised marl, commercial alumina and ferric oxide.

The weight percentage composition of the stock (as oxides) was as follows:

| | |
|---|---|
| CaO (total) | 43.37 |
| SiO$_2$ | 14.66 |
| Al$_2$O$_3$ | 4.29 |
| Fe$_2$O$_3$ | 3.11 |
| ignition losses | 33.95 |

The raw stock (650 g) with a mass layer thickness of 0.5 g/cm² was exposed under normal ambient conditions (atmospheric pressure and ambient temperature from 18° C. to 20° C.) to the effect of a flux of electrons accelerated to an energy of 1.5 MeV at a power of absorbed dose equal to 4 Mrad/s.

After a 110-second treatment, a Portland-cement clinker was produced, having the following weight percentage composition (as oxides):

| | |
|---|---|
| CaO (total) | 64.28 |
| SiO$_2$ | 21.83 |
| Al$_2$O$_3$ | 5.80 |
| Fe$_2$O$_3$ | 4.79 |
| ignition losses | 0.34 |
| CaO (free) | 2.73 |

According to petrographic and X-ray analyses, the Portland-cement clinker obtained had the following weight percentage composition:

| | |
|---|---|
| alite | 67 |
| belite | 25 |
| interstitial matrix | 8 to 10 |

Physico-mechanical tests carried out with a cement made of the clinker indicated that the cement aged 28 days possessed a compression strength from 440 to 480 kgf/cm², and the same cement aged 3 and 7 days, complied with the requirements of the British Standard for normal and fast-setting Portland cement.

EXAMPLE 4

Production of a Portland-cement clinker.

A raw stock mixture comprised marl, alumina and ferric oxide.

The weight percentage composition of the stock (as oxides) was as follows:

| | |
|---|---|
| CaO (total) | 43.37 |
| SiO$_2$ | 14.66 |
| Al$_2$O$_3$ | 4.29 |
| Fe$_3$O$_3$ | 3.11 |
| ignition losses | 33.95 |

The raw stock (compressed) in an amount of 90 g with a mass layer thickness of 3.0 g/cm² was exposed under normal ambient conditions (atmospheric pressure and ambient temperature from 18° to 20° C.) to the effect of a flux of electrons accelerated to an energy of 7.8 MeV at a power of absorbed dose equal to 11 Mrad/s.

After a 50-second exposure, a Portland-cement clinker was obtained, having the following weight percentage composition (as oxides):

| | |
|---|---|
| CaO (total) | 67.17 |
| SiO$_2$ | 21.39 |
| Al$_2$O$_3$ | 6.12 |
| Fe$_2$O$_3$ | 5.05 |
| ignition losses | 0.14 |
| CaO (free) | 0.64 |

According to petrographic and X-ray analyses, the Portland-cement clinker obtained had the following weight percentage composition:

| | |
|---|---|
| alite | 65 |
| belite | 25 |
| interstitial matrix | 10 |

Physico-mechanical tests carried out with a cement made of the clinker indicated that the cement aged 28 days posessed a compression strength from 445 to 490 kgf/cm², and the same cement aged 3 and 7 days, complied with the requirements of the British Standard for normal and fast-setting Portland cement.

EXAMPLE 5

Production of a Portland-cement clinker.

A raw stock mixture comprised marl, alumina and ferric oxide.

The weight percentage composition of the stock (as oxides) was as follows:

| | |
|---|---|
| CaO (total) | 43.37 |
| SiO$_2$ | 14.66 |
| Al$_2$O$_3$ | 4.29 |
| Fe$_2$O$_3$ | 3.11 |
| ignition losses | 33.95 |

The raw stock in an amount of 50 g with a mass layer thickness of 3.0 g/cm$^2$ was exposed under normal ambient conditions (atmospheric pressure and ambient temperature from 18° to 20° C.) to the effect of a flux of electrons accelerated to an energy of 7.8 MeV at a power of absorbed dose equal to 22 Mrad/s.

After a 25-second exposure a Portland-cement clinker was obtained, having the following weight percentage composition (as oxides):

| | |
|---|---|
| CaO (total) | 65.78 |
| SiO$_2$ | 22.37 |
| Al$_2$O$_3$ | 5.98 |
| Fe$_2$O$_3$ | 4.99 |
| ignition losses | 0.19 |
| CaO (free) | 0.21 |

According to petrographic and X-ray analyses, the Portland-cement clinker obtained had the following weight percentage composition:

| | |
|---|---|
| alite | 55 |
| belite | 33 |
| interstitial matrix | 12 |

Physico-mechanical tests carried out with a cement made of the clinker indicated that the cement aged 28 days possessed a compression strength from 490 to 540 kgf/cm$^2$, and the same cement aged 3 and 7 days, complied with the requirements of the British Standard for normal and fast-setting Portland cement.

EXAMPLE 6

Production of a Portland-cement clinker.

A raw stock mixture comprised calcium carbonate, silica gel, alumina and ferric oxide.

The weight percentage composition of the stock (as oxides) was as follows:

| | |
|---|---|
| CaO (total) | 42.72 |
| SiO$_2$ | 13.87 |
| Al$_2$O$_3$ | 3.52 |
| Fe$_2$O$_3$ | 3.02 |
| ignition losses | 36.87 |

The raw stock (compressed) in an amount of 60 g with a mass layer thickness of 3.0 g/cm$^2$ was exposed under normal ambient conditions (atmospheric pressure and ambient temperature from 18° and 20° C.) to the effect of a flux of electrons accelerated to an energy of 7.8 MeV at a power of absorbed dose equal to 20 Mrad/s.

After a 20-second exposure a Portland-cement clinker was obtained, having the following weight percentage composition (as oxides):

| | |
|---|---|
| CaO (total) | 67.66 |
| SiO$_2$ | 22.20 |
| Al$_2$O$_3$ | 5.49 |
| Fe$_2$O$_3$ | 4.70 |
| ignition losses | 0.19 |
| CaO (free) | 0.76 |

According to petrographic and X-ray analyses, the Portland-cement clinker obtained had the following weight percentage composition:

| | |
|---|---|
| alite | 65 |
| belite | 25 |
| interstitial matrix | 8–10 |

Physico-mechanical tests carried out with a cement made of the clinker indicated that the cement aged 28 days possessed a compression strength from 490 to 540 kgf/cm$^2$, and the same cement aged 3 and 7 days, complied with the requirements of the British Standard for normal and fast-setting Portland cement.

EXAMPLE 7

Production of a Portland-cement clinker.

A raw stock mixture comprised calcium carbonate, silica gel, alumina and ferric oxide.

The weight percentage composition of the stock (as oxides) was as follows:

| | |
|---|---|
| CaO (total) | 42.72 |
| SiO$_2$ | 13.87 |
| Al$_2$O$_3$ | 3.52 |
| Fe$_2$O$_3$ | 3.02 |
| ignition losses | 36.87 |

The raw stock (compressed) in an amount of 50 g with a mass layer thickness of 2.9 g/cm$^2$ was exposed under normal ambient conditions (atmospheric pressure and ambient temperature from 18° to 20° C.) to the effect of a flux of electrons accelerated to an energy of 7.8 MeV at a power of absorbed dose equal to 42 Mrad/sec.

After a 7.5-second exposure, a Portland-cement clinker was obtained, having the following weight percentage composition (as oxides):

| | |
|---|---|
| CaO (total) | 67.36 |
| SiO$_2$ | 22.27 |
| Al$_2$O$_3$ | 5.49 |
| Fe$_2$O$_3$ | 4.44 |
| ignition losses | 0.19 |
| CaO (free) | 0.72 |

According to petrographic and X-ray analyses, the Portland-cement clinker obtained had the following weight percentage composition:

| | |
|---|---|
| alite | 66 |
| belite | 23 |
| interstitial matrix | 8–9 |

Physico-mechanical tests carried out with a cement made of the clinker indicated that the cement aged 28 days possessed a compression strength of from 490 to 540 kgf/cm$^2$, and the same cement aged 3 to 7 days, complied with the requirements of the British Standard for normal and fast-setting Portland cement.

The afore-stated Examples 1 to 7 refer to exposures in a flux of accelerated electrons produced by pulsed or continuous accelerators.

EXAMPLE 8

Production of a Portland-cement clinker.

A raw stock mixture comprised marl, alumina and ferric oxide.

The weight percentage composition of the stock (as oxides) was as follows:

| | |
|---|---|
| CaO (total) | 43.37 |
| $SiO_2$ | 14.66 |
| $Al_2O_3$ | 4.29 |
| $Fe_2O_3$ | 3.11 |
| ignition losses | 33.95 |

The raw stock (compressed) in an amount of 100 g with a mass layer thickness of 3 g/cm², was preheated to 270° C., then exposed under normal ambient conditions (atmospheric pressure and ambient temperature from 18° to 20° C.) to the effect of a flux of electrons accelerated to an energy of 7.8 MeV at a power of absorbed dose equal to 11 Mrad/sec.

After a 20-second exposure, a Portland-cement clinker was obtained, having the following weight percentage composition (as oxides):

| | |
|---|---|
| CaO (total) | 67.89 |
| $SiO_2$ | 21.43 |
| $Al_2O_3$ | 6.13 |
| $Fe_2O_3$ | 5.06 |
| ignition losses | 0.33 |
| CaO (free) | 1.09 |

According to petrographic and X-ray analyses, the Portland-cement clinker obtained had the following weight percentage composition:

| | |
|---|---|
| alite | 69 |
| belite | 25 |
| interstitial matrix | 6 |

Physico-mechanical tests carried out with a cement made of the clinker indicated that the cement aged 28 days possessed a compression strength of from 450 to 490 kgf/cm², and the same cement aged 3 and 7 days, complied with the requirements of the British Standard for normal and fast-setting Portland cement.

The amount of energy absorbed, with due account for preheating, was equal to 800 calories per gram of clinker, which is 400 calories per gram clinker lower than under similar conditions without preheating the material to be exposed.

EXAMPLE 9

Production of a Portland-cement clinker.

A raw stock mixture comprised marl, alumina and ferric oxide.

The weight percentage composition of the stock (as oxides) was as follows:

| | |
|---|---|
| CaO (total) | 43.37 |
| $SiO_2$ | 14.66 |
| $Al_2O_3$ | 4.29 |
| $Fe_2O_3$ | 3.11 |
| ignition losses | 33.95 |

The raw stock (compressed) in an amount of 80 g with a mass layer thickness of 2.8 g/cm², was preheated to 420° C., then exposed under normal ambient conditions (atmospheric pressure and ambient temperature from 18° to 20° C.) to the effect of a flux of electrons accelerated to an energy of 7.8 MeV at a power of absorbed dose equal to 11 Mrad/sec.

After a 13-second exposure, a Portland-cement clinker was obtained, having the following weight percentage composition (as oxides):

| | |
|---|---|
| CaO (total) | 66.73 |
| $SiO_2$ | 21.73 |
| $Al_2O_3$ | 5.82 |
| $Fe_2O_3$ | 5.43 |
| ignition losses | 0.22 |
| CaO (free) | 1.34 |

According to petrographic and X-ray analyses, the Portland-cement clinker obtained had the following weight percentage composition:

| | |
|---|---|
| alite | 63 |
| belite | 25 |
| interstitial matrix | 12 |

Physico-mechanical tests carried out with a cement made of the clinker indicated that the cement aged 28 days possessed a compression strength of from 440 to 480 kgf/cm², and the same cement aged 3 and 7 days, complied with the requirements of the British Standard for normal and fast-setting Portland cement.

The amount of energy absorbed, with due account for preheating, was equal to 830 calories per gram of clinker, which is 320 calories per gram of clinker lower than under similar conditions without preheating the material to be exposed.

EXAMPLE 10

Production of a Portland-cement clinker.

A raw stock mixture comprised calcium carbonate, alumina, silica gel and ferric oxide.

The weight percentage composition of the stock (as oxides) was as follows:

| | |
|---|---|
| CaO (total) | 42.72 |
| $SiO_2$ | 13.87 |
| $Al_2O_3$ | 3.52 |
| $Fe_2O_3$ | 3.02 |
| ignition losses | 36.87 |

The raw stock (compressed) in an amount of 50 g with a mass layer thickness of 3 g/cm², was preheated to 540° C., then exposed under normal ambient conditions (atmospheric pressure and ambient temperature from 18° to 20° C.) to the effect of a flux of electrons accelerated to an energy of 7.8 MeV at a power of absorbed dose equal to 20 Mrad/sec.

After a 20-second exposure the Portland-cement clinker was obtained, having, a following weight percentage composition (as oxides):

| | |
|---|---|
| CaO (total) | 67.33 |
| SiO$_2$ | 21.97 |
| Al$_2$O$_3$ | 5.62 |
| Fe$_2$O$_3$ | 4.77 |
| ignition losses | 0.27 |
| CaO (free) | 0.93 |

According to petrographic and X-ray analyses, the Portland-cement clinker obtained had the following weight percentage composition:

| | |
|---|---|
| alite | 58 |
| belite | 27 |
| interstitial matrix | 16 |

Physico-mechanical tests carried out with a cement made of the clinker indicated that the cement aged 28 days possessed a compression strength from 450 to 495 kgf/cm$^2$, and the same cement aged 3 and 7 days, complied with the requirements of the British Standard for normal and fast-setting Portland cement.

The amount of energy absorbed, with due account for preheating, was equal to 825 calories per gram of clinker, which is 340 calories per gram of clinker lower than under similar conditions without preheating the material to be exposed.

EXAMPLE 11

Production of a Portland-cement clinker.

A raw stock mixture comprised calcium carbonate, alumina, silica gel and ferric oxide.

The weight percentage composition of the stock (as oxides) was as follows:

| | |
|---|---|
| CaO (total) | 42.72 |
| SiO$_2$ | 13.87 |
| Al$_2$O$_3$ | 3.52 |
| Fe$_2$O$_3$ | 3.02 |
| ignition losses | 36.87 |

The raw stock (compressed) in an amount of 45 g with a mass layer thickness of 3 g/cm$^2$, was preheated to 650° C., then exposed under normal ambient conditions (atmospheric pressure and ambient temperature from 18° to 20° C.) to the effect of a flux of electrons accelerated to an energy of 7.8 MeV at a power of absorbed dose equal to 42 Mrad/sec.

After a 5-second exposure, a Portland-cement clinker was obtained, having the following weight percentage composition (as oxides):

| | |
|---|---|
| CaO (total) | 66.93 |
| SiO$_2$ | 22.17 |
| Al$_2$O$_3$ | 5.83 |
| Fe$_2$O$_3$ | 4.47 |
| ignition losses | 0.34 |
| CaO (free) | 1.23 |

According to petrographic and X-ray analyses, the Portland-cement clinker obtained had the following weight percentage composition:

| | |
|---|---|
| alite | 63 |
| belite | 27 |
| interstitial matrix | 10 |

Physico-mechanical tests carried out with a cement made of the clinker indicated that the cement aged 28 days possessed a compression strength of from 460 to 490 kgf/cm$^2$, and the same cement aged 3 and 7 days, complied with the requirements of the British Standard for normal and fast-setting Portland-cement.

The amount of energy absorbed, with due account for preheating, was equal to 940 calories per gram of clinker, which is 220 calories per gram of clinker lower than under similar conditions without preheating the material to be exposed.

What we claim is:

1. A method of producing a mineral binder comprising the steps of: forming a layer of a Portland cement raw stock mixture having a uniform thickness, heating the stock mixture to a temperature not over 600° C., and exposing the layer of stock mixture to ionizing radiation with the power of absorbed dose of at least 1 Mrads/s by moving the layer past an ionizing radiation source, the speed of movement being sufficient to thoroughly irradiate the stock mixture to produce a Portland cement clinker.

2. A method of producing a mineral binder comprising the steps of: forming a layer of a Portland cement raw stock mixture having a uniform thickness, and exposing the layer of stock mixture to ionizing radiation with the power of absorbed dose of at least 1 Mrads/s by moving the layer past an ionizing radiation source, at ambient temperature, the speed of movement being sufficient to thoroughly irradiate the stock mixture to produce a Portland cement clinker.

* * * * *